(12) United States Patent
Selzer et al.

(10) Patent No.: US 11,383,205 B2
(45) Date of Patent: Jul. 12, 2022

(54) INTEGRATED MEMBRANE MODULE RACK

(71) Applicant: 3M INNOVATIVE PROPERTIES COMPANY, St. Paul, MN (US)

(72) Inventors: Norbert Selzer, Eichholzer (DE); Stefan Richterich, Bottrop (DE); Martin Ruetering, Wuppertal (DE)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 68 days.

(21) Appl. No.: 16/636,704

(22) PCT Filed: Oct. 18, 2018

(86) PCT No.: PCT/IB2018/058099
§ 371 (c)(1),
(2) Date: Feb. 5, 2020

(87) PCT Pub. No.: WO2019/077546
PCT Pub. Date: Apr. 25, 2019

(65) Prior Publication Data
US 2020/0238216 A1 Jul. 30, 2020

(30) Foreign Application Priority Data
Oct. 19, 2017 (EP) .................................. 17197377

(51) Int. Cl.
*B01D 63/04* (2006.01)
*B01D 65/02* (2006.01)

(52) U.S. Cl.
CPC .......... *B01D 63/046* (2013.01); *B01D 65/02* (2013.01); *B01D 2313/105* (2013.01);
(Continued)

(58) Field of Classification Search
CPC ...... B01D 63/02; B01D 63/04; B01D 63/043; B01D 63/046; B01D 65/02;
(Continued)

(56) References Cited

U.S. PATENT DOCUMENTS 5,034,125 A 7/1991 Karbachsch
5,094,750 A 3/1992 Kopp
(Continued)

FOREIGN PATENT DOCUMENTS

DE 202004002835 4/2004
DE 102005032286 1/2007
(Continued)

OTHER PUBLICATIONS

English language machine translation of EP1743690A1, 11 pages, No Date.*
(Continued)

*Primary Examiner* — Pranav N Patel
(74) *Attorney, Agent, or Firm* — 3M Innovative Properties Company (57) ABSTRACT

Fluid treatment system comprising a row of vertically arranged cylindrical filtration modules having a cylindrical shell, an upper end, a lower end and a shell interior and an upper and a lower header coupled to upper and lower end of the shell. In the shell interior, hollow fiber membranes are embedded with their ends in an upper and a lower tube sheet and are open at the ends. An exterior filtrate space is formed around the membranes extending between upper and lower tube sheets and an inner surface of the shell. Upper and lower head spaces are formed between upper and lower tube sheets and the respective headers. The lumina of the hollow fiber membranes are in fluid communication with the head spaces. The cylindrical shells comprise outlet ports being in fluid communication with the exterior filtrate spaces and
(Continued)

being connected to a filtrate branch pipe. Upper headers are in fluid connection with each other thereby forming an upper collecting duct running along the row at the same level as or above the upper headers. Lower headers are in fluid connection with each other thereby forming a lower collecting duct running along the row on the level of or below the lower headers. The filtrate branch pipes are connected to and open into a filtrate collecting pipe running lengthwise of the row at the upper end of the filtration modules. Upper collecting duct and filtrate collecting pipe are arranged at the upper headers eccentrically and on different sides with respect to a cross-sectional center of the shell and parallel to each other at the same height level.

12 Claims, 4 Drawing Sheets

(52) U.S. Cl.
CPC ...... *B01D 2313/13* (2013.01); *B01D 2313/21* (2013.01); *B01D 2317/04* (2013.01)
(58) Field of Classification Search
CPC ............ B01D 2313/06; B01D 2313/10; B01D 2313/105; B01D 2313/12; B01D 2313/125; B01D 2313/13; B01D 2313/20; B01D 2313/21; B01D 2317/04; B01D 2317/06; B01D 2201/301; B01D 2201/295; B01D 2201/296
See application file for complete search history.

(56) References Cited

U.S. PATENT DOCUMENTS

| 2003/0003875 | A1 | 1/2003 | Oestreich | |
|---|---|---|---|---|
| 2012/0074053 | A1* | 3/2012 | Collignon | B01D 63/02 210/209 |
| 2016/0131086 | A1* | 5/2016 | Thalmann | F02M 37/34 210/184 |
| 2016/0200612 | A1* | 7/2016 | Lee | C02F 9/005 210/202 |
| 2016/0228822 | A1* | 8/2016 | Cao | B01D 63/04 |

FOREIGN PATENT DOCUMENTS

| EP | 0525096 | 2/1993 |
|---|---|---|
| EP | 1743690 | 1/2007 |
| WO | WO 2013-048801 | 4/2013 |

OTHER PUBLICATIONS

"Pentair X-Flow—X-line rack", PENTAIR, retrieved from the internet on Mar. 31, 2020, URL <https://www.youtube.com/watch?v=K182jYS0dOA>, 2015, pp. 1-.
"T-Rack® rack systems", BASF, retrieved from the internet on Mar. 31, 2020, URL <http://www.inge.basf.com/ev/internet/inge/en/content/inge/Produkte/rack_system>, 2013, pp. 1-2.
International Search Report for PCT International Application No. PCT/IB2018/058099, dated Feb. 5, 2019, 4 pages.

* cited by examiner

INTEGRATED MEMBRANE MODULE RACK

CROSS REFERENCE TO RELATED APPLICATIONS

This application is a national stage filing under 35 U.S.C. 371 of PCT/IB2018/058099, filed 18 Oct. 2018, which claims the benefit of EP Application No. 17197377.9, filed 19 Oct. 2017, the disclosures of which are incorporated by reference in their entirety herein.

The invention relates to a fluid treatment system comprising at least one row of a plurality of vertically arranged cylindrical filtration modules, wherein each cylindrical filtration module has a cylindrical shell with an upper end, a lower end and a shell interior and has an upper header and a lower header coupled to the upper end and the lower end, respectively, of the cylindrical shell, a bundle of hollow fiber membranes being arranged in the shell interior, wherein the hollow fiber membranes are embedded with their ends in an upper tube sheet and a lower tube sheet, which tube sheets being fluid-tightly sealed to an inner surface of the cylindrical shell such that an exterior filtrate space is formed around the hollow fiber membranes which extends between upper tube sheet, lower tube sheet and the inner surface of the cylindrical shell.

Fluid treatment systems of this kind e.g. are used in facilities for water and waste water treatment or in industrial plants. Depending on the membrane type, liquids, in particular water, are freed from particles and dissolved substances by filtration through the membrane walls. It is also possible to separate dissolved substances such as salts. The filtration process is simple and safe, without the addition of chemicals and with little energy expenditure. Filtration modules usually are used comprising an elongated hollow cylindrical shell as housing with a bundle of hollow fiber membranes being arranged inside the cylindrical shell and extending along the length of the hollow cylinder. The hollow fiber membranes used for filtration of the liquids may have a porous semipermeable wall structure and the liquid to be filtered is forced through the membrane wall either from the lumen of the hollow fiber membranes to the outside or vice versa, depending on the type of membrane and on the specific application.

The filtration modules are integrated into a pipeline through which the liquid to be filtered flows. Several filtration modules are connected in rows and several rows of filtration modules are arranged in parallel in order to achieve the desired capacity of the fluid treatment system. The filtration modules of the fluid treatment system are arranged vertically next to one another in a rack and each filtration module is closed at its ends by end caps or headers from which connecting pipes branch off, opening into collecting pipes extending along the row of the filtration modules. A disadvantage of known systems is that the design of a filtration installation requires quite a large space and often a large number of connecting components such as pipe couplings is required in order to connect connecting pipes to the associated collecting pipe.

The WO 2013/048801 relates to a fluid treatment system comprising a plurality of filtration modules fluidly connected to one another by collecting ducts or manifolds wherein the filtrations modules are arranged in banks or rows that form large arrays. WO 2013/048801 discloses a common filtrate transfer manifold, a fluid transfer manifold and a fluid control manifold being arranged between the rows of filtration modules. Another reference relates to a filtration module arrangement that allows removing suspended matter of raw water deposited in the hollow fiber modules of the arrangement during use by means of backwashing. This filtration module arrangement comprises a plurality of filtrations modules arranged in rows with a raw water supply pipe, an air supply pipe, a drain pipe, and a discharge pipe being arranged between the rows of the filtration modules.

EP-A-0 525 096 discloses membrane filter cartridges and filter cartridge assemblies with the cartridges arranged in rows for application in cross flow filtration. The cartridges disclosed in this document have technically complex headers at the ends of the cartridges for combined feed charge and concentrate and filtrate discharge into and out of the filter cartridges, respectively, with which headers the filter cartridges are connected to form the rows.

U.S. Pat. No. 5,094,750 relates to a fluid filter having a bundle of hollow fibers within a casing. At one end of the casing there is a transfer header which has a feed passageway therethrough and having a discharge port for delivering feed to the casing and to the exterior of the fibres. The transfer header also has a filtrate passageway therethrough and in communication with the open ends of the fibers. The transfer header has an off-set portion at a side portion of the header which off-set portion extends beyond the casing of the filter and which off-set portion houses the feed passageway. The filtrate passageway extends through the top portion of the header. A plurality of fluid filters is assembled together to form a bank of filter units with the filter units being connected to each other via their transfer headers.

DE-A-20 2004 002 835 shows a filtration system comprising parallel rows of filtration modules, wherein connection pipes are arranged on the face of the filtration modules coaxially, which connection pipes lead over a bend to respective central collecting lines between the rows of filtration modules. For the transfer between the filtration module and the coaxial outgoing connecting tube of smaller diameter, funnel-like end caps are provided, which are attached to the filtration module via pipe couplings. This connecting solution requires quite a few individual components, which are complicated to install.

EP-A-1 743 690 discloses a water filtration system comprising rows of filter modules. The filter modules of each row are linked at top and bottom by horizontal liquid collection pipes for the liquid to be filtered and the concentrate. Each filter module has a branch pipe for the filtrate at the top which branch pipes extend between neighboring modules of adjacent rows. The branch pipes between the rows of filtrate modules are connected to a filtrate collection pipe common for two neighboring rows and running above and parallel to the two adjacent top liquid collecting pipes. By its design, the filtration systems of EP-A-1 743 690 are comparatively high and a distance between the rows is necessary because of the connecting branch pipes between the rows.

The object of the present invention is to further improve a filtration system of the type described above in such a way that a space-saving construction is realized Moreover, the number of components for installation should be reduced and the fluid a few components which are simple to assemble.

The problem is solved by a fluid treatment system comprising
    at least one row of a plurality of vertically arranged cylindrical filtration modules, each cylindrical filtration module having a cylindrical shell with an upper end, lower end and a shell interior and having an upper header and a lower header coupled to the upper end and the lower end, respectively, of the cylindrical shell, a bundle of hollow fiber membranes being arranged in the shell interior with the hollow fiber membranes being embedded with their ends in an upper tube sheet and a lower tube sheet such that the hollow fiber membranes are open at their ends, which tube sheets being fluid-tightly sealed to an inner surface of the cylindrical shell such that an exterior filtrate space is formed around the hollow fiber membranes which extends between upper tube sheet, lower tube sheet and the inner surface of the cylindrical shell, wherein an upper head space being formed between upper tube sheet and upper header and a lower head space being formed between lower tube sheet and lower header, wherein the hollow fiber membranes each having a lumen and a wall and the lumina of the hollow fiber membranes being in fluid communication with upper and lower head spaces, wherein the cylindrical shell comprises an outlet port attached thereto and being in fluid communication with the exterior filtrate space and being connected to a filtrate branch pipe, wherein the upper headers of the cylindrical filtration modules are in fluid connection with each other whereby an upper collecting duct is formed allowing fluid flow into the upper head spaces of the cylindrical filtration modules and running lengthwise of the at least one row at the same level as or above the upper headers of the cylindrical filtration modules, wherein the lower headers of the cylindrical filtration modules are in fluid connection with each other whereby an lower collecting duct is formed allowing fluid flow into the lower head spaces of the cylindrical filtration modules and running lengthwise of the at least one row on the level of or below the lower headers of the cylindrical filtration modules and wherein the filtrate branch pipe of each cylindrical filtration module opens into a filtrate collecting pipe running lengthwise of the at least one row at the upper end of the cylindrical filtration modules, characterized in that upper collecting duct and filtrate collecting pipe are arranged at the upper headers of the filtration modules eccentrically with respect to a cross-sectional center of the cylindrical shell and on different sides of the center and are arranged side by side and parallel to each other at the same height level.

By arranging upper collecting duct and filtrate collecting pipe side by side and parallel to each other at the same height a fluid treatment system having a comparatively small height can be obtained and a space-saving design can be realized. Moreover, each row of vertically arranged cylindrical filtration modules forms its own unit in that each row has its own supply and discharge lines and thus can be handled separately.

During application, a fluid to be treated may be fed to the filtration modules of the at least one row of vertically arranged filtration modules via the upper collecting duct, from which it may be distributed to the filtration modules and introduced into the upper head spaces of the filtration modules. From there, the fluid to be treated enters the lumina of the hollow fiber membranes being arranged in the shell interior of the filtration modules and flows through the lumina. Part of the fluid to be treated flows as filtrate across the walls of the hollow fiber membranes into the exterior filtrate space which is formed around the hollow fiber membranes and which extends between upper tube sheet, lower tube sheet and the inner surface of the cylindrical shell. The filtrate collected in the exterior filtrate space leaves the exterior filtrate space via the outlet ports attached to the cylindrical shells of the filtration modules, flows through the filtrate branch pipes and is collected in the filtrate collecting pipe running lengthwise of the at least one row at the upper end of the cylindrical filtration modules.

The retentate or concentrate remaining in the lumina of the hollow fiber membranes flows into the lower head spaces being formed between lower tube sheets and lower headers of the filtration modules and is drained off via the lower collecting duct.

Of course, applications are also possible in which the fluid to be treated is fed into the filtration modules via the lower collecting duct, runs upwardly though the filtration modules and the concentrate is collected in the upper headers and drained off via the upper collecting duct.

Depending on the intended use of the fluid treatment system the hollow fiber membranes contained in the filtration modules may preferably be membranes for ultrafiltration or microfiltration. The number of hollow fiber membranes, the necessary filtration area per filtration module and number of filtration modules depend on the flow volume of the fluid to be filtered during application. To adapt to the flow requirements, it may be necessary for the fluid treatment system to have two or more rows of vertically arranged cylindrical filtration modules in parallel connection.

For the cylindrical filtration modules and their cylindrical shells, respectively, various cross sections are possible, when looked along their length axis. The cross section may be round, oval, quadratic, rectangular etc. Preferably the cross section may be round for obtaining e.g. a high pressure stability of the modules.

In an advantageous embodiment the bundle of hollow fiber membranes may be incorporated in a cartridge comprising the bundle of hollow fiber membranes, the upper tube sheet and the lower tube sheet, into which the hollow are embedded such that they penetrate the respective tube sheet and are open at their ends. The cartridge preferably may be arranged in the shell interior in a removable manner such that an exchange of the cartridge is possible e.g. in case of leakages of hollow fiber membrane of the cartridge. Sealing between the tube sheets and the inner surface of the cylindrical shell may be accomplished by an adhesive or by a potting material or e.g. by sealing rings in case of a removable cartridge.

Upper header and/or lower header may permanently or releasably connected to the cylindrical shell. In case of a permanent connection, upper header and/or lower header may be joined with the cylindrical shell via an adhesive or by welding. In particular when the bundle of hollow fiber membranes is incorporated in a cartridge, a releasable or detachable connection is preferred. In case of a releasable or detachable connection upper header and/or lower header may be joined via screw thread, a flanged joint or a Victaulic coupling etc. A releasable or detachable connection of upper header and/or lower header to the cylindrical shell may offer the advantage of the shell or module interior in case of e.g. a damage in the bundle of hollow fibers, leakages etc.

In the present fluid treatment system preferably the lower collecting duct, too, may be arranged eccentrically with respect to a cross-sectional center of the cylindrical shell. More preferably upper collecting duct and lower collecting duct are positioned at opposite sides of the cross-sectional center of the cylindrical shell. Such an arrangement of upper collecting duct and lower collecting duct at opposite sides of the filtration modules supports a homogeneous flow distribution of a fluid to be filtered through the filtration modules.

In order to enhance easy and flexible assembling, in a preferred embodiment of the fluid treatment system the upper collecting duct is integrated into the upper header. In this embodiment, the upper header of each cylindrical filtration module preferably has a T-shaped form when looked perpendicular to the at least one row from the side where the upper collecting duct is arranged, which T-shaped form has a lower part being connected to the upper end of the cylindrical shell and horizontal side ports being directed lengthwise of the at least one row. The horizontal side ports of neighboring filtration modules within a row, which are facing each other, are connected to form the upper collecting duct.

In a further preferred embodiment the lower header of each cylindrical filtration module has a T-shaped form when looked perpendicular to the at least one row, which T-shaped form has an upper part being connected to the lower end of the cylindrical shell and horizontal side ports directed lengthwise of the at least one row. It is a further preferred embodiment of the fluid treatment system where upper header of each cylindrical filtration module and lower header of each cylindrical filtration modules have a T-shaped form.

The horizontal side ports of neighboring filtration modules facing each other may be connected via connecting tubes or short fittings to form the upper and/or collecting duct, respectively. In an alternative, the horizontal arms of the T-shaped upper and/or lower headers may extend beyond the respective filtration modules and the arms of neighboring filtration modules may be connected to each other to form the upper and/or lower collecting duct, respectively. The connection of side ports, connecting tubes, short fittings and/or horizontal arms of neighbouring filtration modules may be a fluid tight permanent joining via an adhesive or a welded joint, for example. In a preferred embodiment, the connection may be detachable fluid tight joint e.g. a screwed joint in form of a coupling ring, a flanged joint or a Victaulic coupling etc.

In particular embodiments in which upper and/or lower headers have a T-shaped form and in which at least a part of the upper collecting duct and the lower collecting duct, respectively, is integrated into the upper and lower header, respectively, allow for a compact design, not only in width direction but also in height direction. Moreover, numerous connecting elements and fittings which may be necessary with other designs, can be avoided.

For cases of the upper header of each cylindrical filtration module having a T-shaped form it is preferred, if the upper header has an asymmetric contour when looked along the at least one row with a higher section on the side of the upper collecting duct and a lower section on the side of the filtrate collecting pipe. In this case, the filtrate collecting pipe preferably may be positioned on top of the lower section such that it is on the same level as the upper collecting duct. In this case, when looked in the direction of the at least one row, the upper collecting duct is integrated into the upper header in the higher section of the upper header, while the filtrate collecting pipe runs outside and on top of the upper header. In addition to the attachment of the filtrate collecting pipe to the filtration modules via the filtrate branch pipes of the filtration modules the filtrate collecting pipe may be fixed to the upper headers e.g. via clamps which are attached to the headers.

The filtrate collecting pipe may also be integrated into the upper headers and may lead through the upper headers of the filtration modules. Thus, in a further preferred embodiment of the fluid treatment system each upper header may have a filtrate passageway therethrough which is part of the filtrate collecting pipe,
  wherein the filtrate passageways of the upper headers are fluid-tightly sealed to an outer wall of the upper headers at the points where said passageways pass through the outer wall of said headers,
  wherein the filtrate passageways are arranged parallel to the extension of the at least one row of the plurality of vertically arranged filtration modules and
  wherein the passageways of neighbouring filtration modules are connected to each other to form the filtrate collecting pipe.

The filtrate passageways may be joined to connecting elements or pipe segments which connect the filtrate passageways to form the filtrate collecting pipe. In a further embodiment the filtrate passageways may extend beyond the respective headers and preferably may have a sufficient length so that the passageways of neighbouring filtration modules may be attached to each other at their neighbouring ends in a sealed manner. Attachment of the neighbouring ends may be accomplished e.g. by screwed joints in form of coupling rings, or by flanged joints or Victaulic couplings or by welding or soldering. The sections of the passageways extending beyond the upper headers and the connecting elements or pipe segments, respectively, may have side ports for connecting to the filtrate branch pipes. The passageways of neighbouring filtration modules of the at least one row may be also be connected to each other via the side branches of a T-fitting, wherein the 90° branch of the T-fitting is connected to a respective filtrate branch pipe. Also in this case, the connections can accomplished e.g. by coupling rings, by flanged joints or Victaulic couplings or by welding or soldering.

In a further preferred embodiment of the fluid treatment system the upper header of each cylindrical filtration module may have a port connecting the upper head space of the filtration modules to respective side ports of an upper collecting pipe forming the upper collecting duct. The upper collecting pipe runs lengthwise of the at least one row above the upper headers of the cylindrical filtration modules and connects the upper head spaces of the cylindrical filtration modules. Likewise, the upper headers of the filtration modules may be integral part of an upper collecting pipe forming the upper collecting duct. In this case, the upper collecting pipe has side ports being formed as upper headers.

Furthermore, in the present fluid treatment system the lower header of each cylindrical filtration module preferably may have a port connecting the lower head spaces of the filtration modules to respective side ports of an lower collecting pipe forming the lower collecting duct. The lower collecting pipe runs lengthwise of the at least one row below the lower headers of the cylindrical filtration modules and connects the lower head spaces of the cylindrical filtration modules. Likewise, the lower headers of the filtration modules may be integral part of an lower collecting pipe forming the lower collecting duct. In this case, the lower collecting pipe has side ports being formed as lower headers.

In a further advantageous embodiment of the fluid treatment system
  the upper header of each cylindrical filtration module may have a port connecting the respective upper head space to an upper collecting pipe forming the upper collecting duct, which upper collecting pipe is connecting the upper head spaces of the cylindrical filtration modules and is running lengthwise of the at least one row above the upper headers of the cylindrical filtration modules at the same height level as the filtrate pipe and/or the lower header of each cylindrical filtration module has a port connecting the respective lower head space to a lower collecting pipe forming the lower collecting duct which lower collecting pipe running lengthwise of the at least one row below the lower headers of the cylindrical filtration modules and connecting the lower head spaces of the cylindrical filtration modules In this case, preferably upper collecting pipe and/or lower collecting pipe are formed from individual T-pieces being allocated to the individual headers of the individual cylindrical filtration modules, which T-pieces are connected with their 90° branches to the headers of the individual cylindrical filtration modules and are connected to one another with their horizontal branches to form upper collecting pipe and lower collecting pipe, respectively.

Preferably, the filtrate collecting pipe may also be formed from individual T-pieces being allocated to the individual cylindrical filtration modules and being horizontally connected with one another with their horizontal branches to form the filtrate collecting pipe, wherein the 90° branches of the T-pieces being connected to the filtrate branch pipes of the associated cylindrical filtration modules. For fluid treatment systems of this kind easy assembling of system is possible.

As for the T-shaped headers, the individual T-pieces may fluid-tightly be joined permanently via an adhesive or a welded joint, for example, or in a preferred embodiment, may detachable be joined e.g. via a screwed joint in form of a coupling ring, a flanged joint or a Victaulic coupling etc. Also the 90° branches may permanently or detachable be joined to the respective ports of the headers.

Preferably, upper collecting pipe, lower collecting pipe and/or filtrate collecting pipe may have a circular cross section.

In order to further optimize the fluid treatment system with respect to the required space for setup, the filtrate branch pipes of the cylindrical filtration modules within the at least one row preferably may be arranged between the filtration modules such that the branch pipes do not extend beyond the cylindrical filtration modules when looked along the at least one row. Even in this case the filtration modules of the at least on row may be arranged next to each other in a close manner. Thus, the filtrate branch pipes of the cylindrical filtration modules may preferably arranged within the wedge formed between neighbouring filtration modules of the at least one row when viewed from the top.

In a preferred embodiment of the fluid treatment system the outlet port attached to the cylindrical shell of the filtration modules may be directly below or at most slightly offset against the filtrate collecting pipe when viewed from the top of the filtration modules. This offers the advantage of a direct connection of the outlet ports with the filtrate collecting pipe via the filtrate branch pipes without unnecessary deviations.

With respect to a space saving design of the fluid treatment system, upper header and/or upper collecting duct and filtrate collecting duct and also lower header and lower collecting duct may extend beyond the outer diameter of the cylindrical shell of the filtration modules preferably by at most 20%, relative to the outer diameter of the cylindrical shell of the filtration modules, when looked along the at least one row. In a more preferred embodiment upper header and lower header may extend by at most 20% beyond the outer diameter of the cylindrical shell of the filtration modules and upper collecting duct and filtrate collecting duct do not extend beyond the upper header and the lower collecting duct does not extend beyond the lower header. In the preferred case of integrated upper headers with the upper collecting duct being integrated into the upper headers and the upper header having an asymmetric contour when looked along the at least one row and the filtrate collecting duct being arranged on top of the lower section of the asymmetric contour the filtrate collecting pipe advantageously may extend beyond the outer diameter of the cylindrical shell of the filtration modules by at most 20%, relative to the outer diameter of the cylindrical shell of the filtration modules, when looked along the at least one row.

The present filtration system allows close arrangement of the filtration modules within one row, but also a close arrangement of multiple rows of filtration modules side by side. Thus, beside an improvement with respect to the height requirement of the installed filtration system due to an arrangement of upper collecting duct and filtrate collecting pipe side by side and parallel to each other at the same height, the filtration system also offer the advantage of a comparatively small specific footprint, i.e. a small installation area related to the installed membrane surface area available for filtration of the fluid to be filtered. Thus, the filtration system of the invention can be built in a very compact design.

In order to improve mechanical stability the fluid treatment system comprising a plurality of filtration modules may be incorporated into a support rack comprising e.g. a frame assembly for mounting the filtration modules. Support racks known in the art may be used for the fluid treatment system of the invention.

The fluid treatment system will be explained in more detail based on the following figures. The figures show preferred embodiments of the fluid system of the invention, which embodiments are, however, not understood to be limiting.

Figure 1:
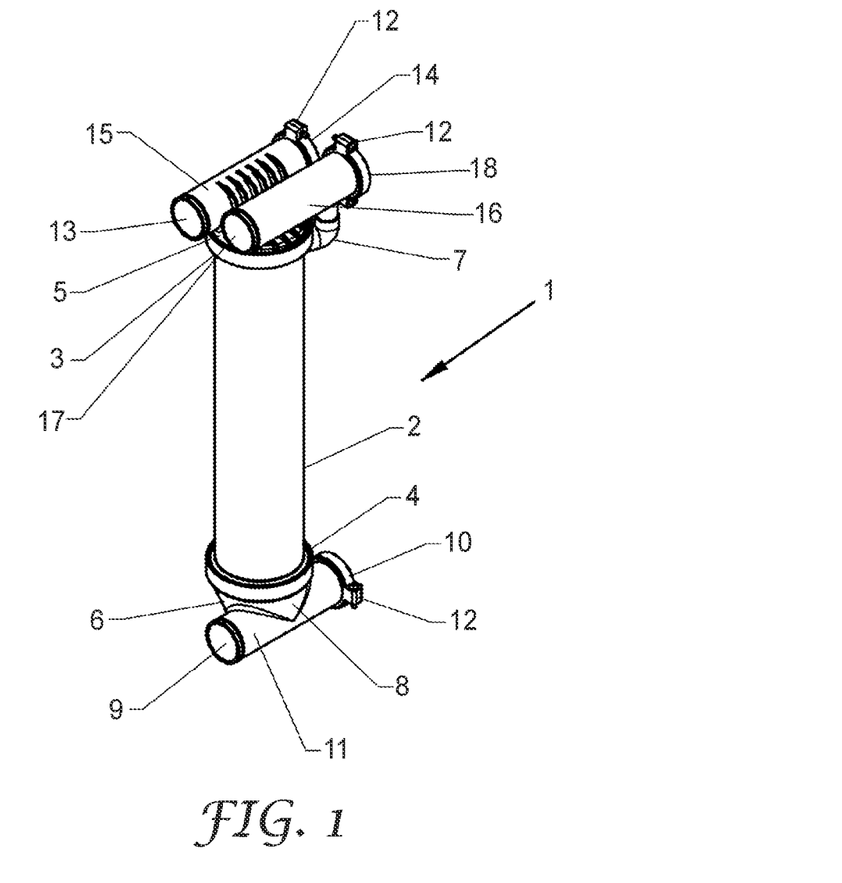
FIG. 1 is a perspective view of a single cylindrical filtration module for use in a fluid treatment system according to the invention.
Figure 4:
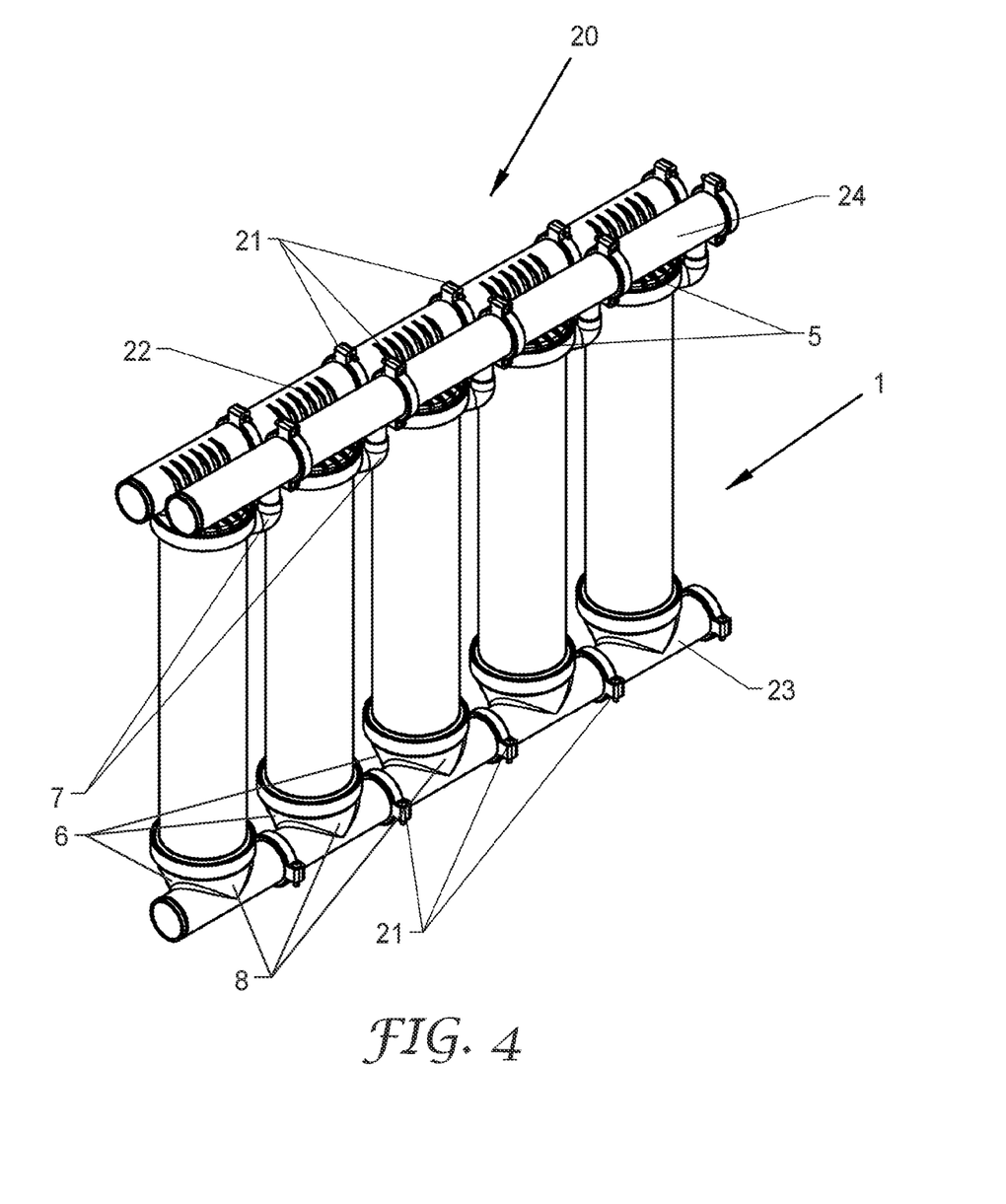

FIG. 4 is a perspective view of a row of cylindrical filtration modules for use in a fluid treatment system according to the invention FIG. 1 shows a perspective view of a single cylindrical filtration module 1 for use in a fluid treatment system according to the invention. The cylindrical filtration module 1 has a cylindrical shell 2 with an upper end 3 and a lower end 4. An upper header 5 is coupled to the upper end 3 and a lower header 6 is coupled to the lower end 4 of the cylindrical shell 2. Inside the cylindrical shell 2 in the shell interior a bundle of hollow fiber membranes is arranged, wherein the hollow fiber membranes are embedded with their ends in an upper tube sheet and a lower tube sheet (not shown). Cylindrical shell 2 comprises an outlet port being in fluid communication with the exterior filtrate space. To the outlet port, a filtrate branch pipe 7 is connected.

The lower header 6 of the cylindrical filtration module 1 has a T-shaped form, which T-shaped form has an upper part 8 being connected to the lower end 4 of the cylindrical shell 2 and horizontal side arms with side ports 9, 10, which horizontal side arms form lower collecting duct segment 11 and are directed lengthwise of the at least one row of the filtration modules forming the fluid treatment system of the invention. The horizontal arms of lower header 6 are connectable with corresponding arms of the headers of neighboring filtration modules within a row via connectors 12 which may be Victaulic couplings. The connected lower collecting duct segments 11 of the neighboring filtration modules form the lower collecting duct.

Upper header 5 has a design in T-shaped form corresponding to the design of lower header 6, however is arranged mirror reversed with respect to a center plane through the filtration module. The T-shaped upper header has a lower part being connected to the upper end 3 of the cylindrical shell 2 (not visible) and horizontal side arms with side ports 13, 14. The horizontal side arms form upper collecting duct segment 15 and are directed lengthwise of the at least one row of the filtration modules forming a row of the fluid treatment system of the invention. The horizontal arms of upper header 6 are connectable with corresponding arms of the upper headers of neighbouring filtration modules within a row via connectors 12 which may be Victaulic couplings. The connected arms of the T-shaped upper headers or the upper collecting duct segments 15, respectively, form the upper collecting duct.

Parallel to and on the same level as upper collecting duct segment 15 pipe segment 16 is arranged on top of upper header 5. Upper header 5 is designed asymmetrically with a higher section forming the T-shaped part of the upper header 5 and a lower section allowing arrangement of pipe segment 16 on top of upper header 5. Pipe segment 16 is connected to filtrate branch pipe 7 which opens into pipe segment 16. Ends 17,18 of pipe segment 16 are to be connected to the ends of the pipe segments of the neighbouring filtrate modules in the row of filtration modules forming the fluid treatment system of the invention, thus forming the filtrate collecting pipe. Connection of the pipe segments again may be carried out by e.g. Victaulic couplings 12.

Figure 2:
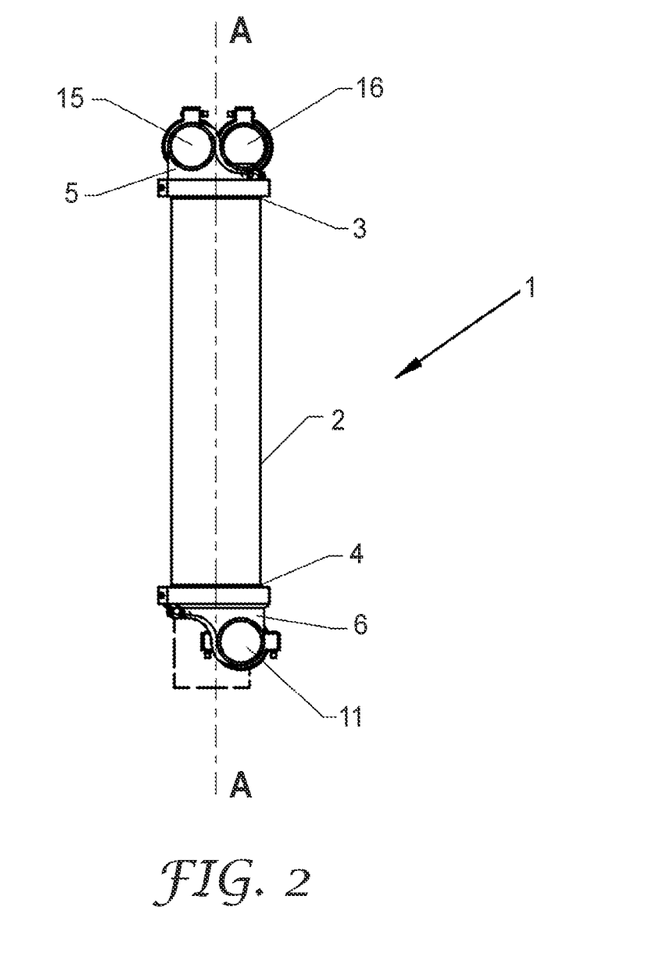
FIG. 2 is a side view of the filtration module of FIG. 1

FIG. 2 is a schematic side view of the filtration module 1 of FIG. 1 in direction of the extension of upper collecting duct segment 15, pipe segment 16 and lower collecting duct segment 11. Same components are designated with the same reference numbers and a detailed description of corresponding elements is not repeated.

FIG. 2 shows that upper header 5 and lower header 6 have an asymmetric contour when looked in direction of the extension of upper collecting duct segment 15, pipe segment 16 and lower collecting duct segment 11, which is be also the direction along the at least one row of the fluid treatment system. Upper header 5 has a higher section on the side of the upper collecting duct or upper collecting pipe segment 15 and a lower section on the side of the filtrate collecting pipe or filtrate collecting pipe segment 16. The filtrate collecting pipe segment 16 is positioned on top of the lower section of upper header 5 such that it is on the same level as the upper collecting duct segment 15. By that, in the fluid treatment system build up with filtration modules shown in FIGS. 1 and 2 upper collecting duct and filtrate collecting pipe are arranged side by side on the same level. In the embodiment shown in FIG. 2 upper collecting duct segment 15 is integrated into upper header 5, while filtrate collecting pipe segment 16 runs outside and on top of upper header 5.

Upper collecting duct segment 15 and filtrate collecting pipe segment 16 are arranged at upper header 5 of the filtration module 1 eccentrically with respect to a cross-sectional center A-A of the cylindrical shell 2 and on different sides of the center A-A. Lower header 6 has likewise an asymmetric contour and lower collecting duct segment 11 is integrated into lower header 6 at the higher section of lower header 6. Lower header 6 is attached to cylindrical shell 2 such that lower collecting duct segment 11, too, is arranged eccentrically with respect to cross-sectional center A-A of cylindrical shell 2. Upper collecting duct segment 15 and lower collecting duct segment 11 and thus upper collecting duct and lower collecting duct are positioned at opposite sides of the cross-sectional center A-A of cylindrical shell 2. Arrangement of upper collecting duct and lower collecting duct at opposite sides of the filtration modules supports a homogeneous flow distribution of a fluid to be filtered through the filtration modules.

As is shown in FIG. 2, upper header 5, upper collecting duct segment 15 and filtrate collecting duct segment 16 as well as lower header 6 and lower collecting duct segment 11 extend beyond the outer diameter of cylindrical shell 2 of filtration module 1 by less than 20%, relative to the outer diameter of cylindrical shell 2 of filtration module 1, when looked along the duct segments. This allows for a space saving arrangement of the filtration modules within a fluid treatment device according to the invention.

Figure 3:
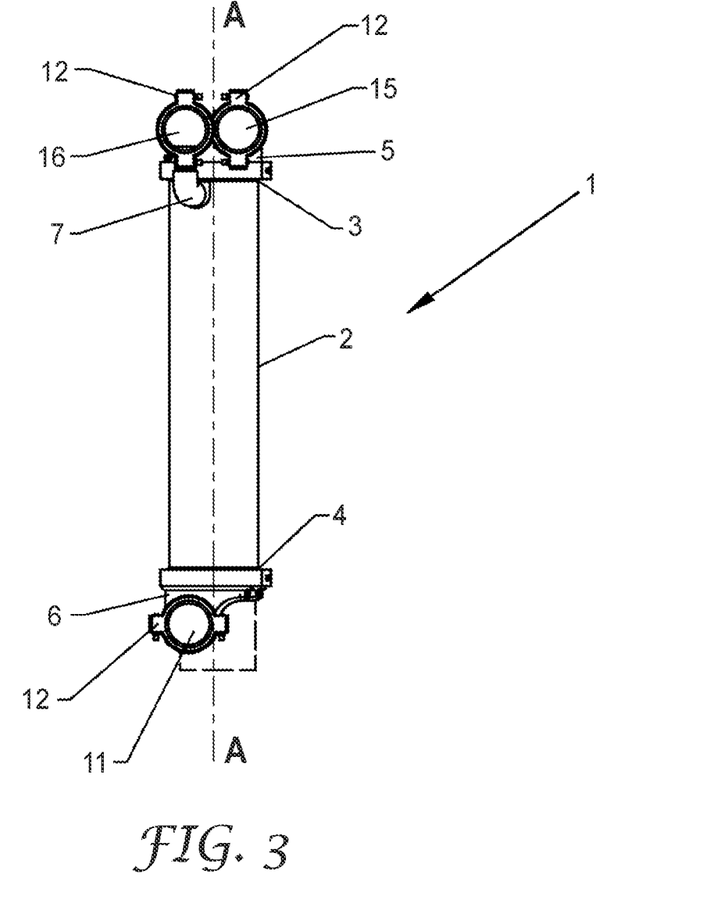
FIG. 3 is a side view of the filtration module of FIG. 1 opposite to the view shown in FIG. 2

FIG. 3 is a schematic representation of the filtration module 1 of FIGS. 1 and 2 in a side view opposite to the one shown in FIG. 2. Again, same components are designated with the same reference numbers and a detailed description of corresponding elements is not repeated. In this view, filtrate branch pipe 7 is visible, which extends between the cylindrical shell 2 of the filtration module 1 and filtrate collecting pipe segment 16, into which filtrate branch pipe 7 opens out. Filtrate branch pipe 7 is arranged in relation to the extension of filtration pipe segment 11 such that it extends in the same direction as filtration pipe segment 11 and thus will be located between neighboring filtration modules within a row of the fluid treatment system. By this arrangement, filtrate branch pipe 7 does not extend beyond cylindrical filtration module 1 when viewed in the direction of the filtrate collecting pipe segment and, as a consequence, the filtrate branch pipes of the filtration modules of a row of the fluid treatment system of the invention do not extend beyond the filtration modules of the row.

FIG. 4 shows in a perspective view a row 20 of vertically arranged filtration modules 1 of the kind shown in FIGS. 1 to 3. In this example, five filtration modules 1 are connected in series. Upper collecting duct segments, lower collecting duct segments and filtrate pipe segments of neighboring filtration modules 1 are connected to each other by connecting elements 21 e.g. in form of Victaulic couplings and thus form upper collecting duct 22, lower collecting duct 23 and filtrate pipe 24, respectively. Upper collecting duct 22 and filtrate collecting pipe 24 are arranged at the upper headers of the filtration modules 1 eccentrically with respect to a cross-sectional center of the cylindrical shells and on different sides of the center of the filtration modules and run side by side and parallel to each other at the same height level. The filtrate branch pipes 7 of the filtration modules 1 open into the filtrate pipe segments forming filtration pipe 24 and are arranged between the filtration modules 1 such that they do not extend do not extend beyond the filtration modules when looked along the row.

The invention claimed is:

1. Fluid treatment system comprising at least one row of a plurality of vertically arranged cylindrical filtration modules,     each of the vertically arranged cylindrical filtration modules having a cylindrical shell with an upper end, a lower end and a shell interior and having an upper header and a lower header coupled to the upper end and the lower end, respectively, of the cylindrical shell,     a bundle of hollow fiber membranes being arranged in the shell interior with the hollow fiber membranes being embedded with their ends in an upper tube sheet and a lower tube sheet such that the hollow fiber membranes are open at their ends, which tube sheets being fluid-tightly sealed to an inner surface of the cylindrical shell such that an exterior filtrate space is formed around the hollow fiber membranes which extends between upper tube sheet, lower tube sheet and the inner surface of the cylindrical shell, wherein an upper head space being formed between upper tube sheet and upper header and a lower head space being formed between lower tube sheet and lower header, wherein the hollow fiber membranes each having a lumen and a wall and the lumina of the hollow fiber membranes being in fluid communication with upper and lower head spaces, wherein the cylindrical shell comprises an outlet port attached thereto and being in fluid communication with the exterior filtrate space and being connected to a filtrate branch pipe, wherein each row of the vertically arranged cylindrical filtration modules comprises two collecting ducts and a filtrate collecting pipe, wherein the upper headers of the cylindrical filtration modules are in fluid connection with each other whereby a first of the two collecting ducts is formed as an upper collecting duct allowing fluid flow into the upper head spaces of the cylindrical filtration modules and running lengthwise of the at least one row at the same level as or above the upper headers of the cylindrical filtration modules, wherein the lower headers of the cylindrical filtration modules are in fluid connection with each other whereby a second of the two collecting ducts is formed as an lower collecting duct allowing fluid flow into the lower head spaces of the cylindrical filtration modules and running lengthwise of the at least one row on the level of or below the lower headers of the cylindrical filtration modules wherein the filtrate branch pipe of each cylindrical filtration module is connected to and opens into the filtrate collecting pipe running lengthwise of the at least one row at the upper end of the cylindrical filtration modules, wherein the upper collecting duct and the filtrate collecting pipe are arranged at the upper headers of the filtration modules eccentrically with respect to a cross-sectional center of the cylindrical shell and on different sides of the center and are arranged side by side and parallel to each other at the same height level, and wherein the lower collecting duct is arranged eccentrically with respect to the cross-sectional center of the cylindrical shell and wherein upper collecting duct and lower collecting duct are positioned at opposite sides of the cross-sectional center of the cylindrical shell.

2. Fluid treatment system according to claim 1, characterized in that the upper collecting duct is integrated into the upper header in that the upper header of each cylindrical filtration module has a T-shaped form having a lower part being connected to the upper end of the cylindrical shell and horizontal side ports being directed lengthwise of the at least one row, wherein the horizontal side ports of neighbouring filtration modules facing each other are connected to form the upper collecting duct.

3. Fluid treatment system according to claim 2, wherein the upper header has an asymmetric contour when looked along the at least one row with a higher section on the side of the upper collecting duct and a lower section on the side of the filtrate collecting pipe and wherein the filtrate collecting pipe is positioned on top of the lower part such that it is on the same level as the upper collecting duct.

4. Fluid treatment system according to claim 2, wherein each upper header has a filtrate passageway therethrough being part of the filtrate collecting pipe,
wherein the filtrate passageways are fluid-tightly sealed to an outer wall of the upper headers at the points where the filtrate passageways pass through the outer wall of said headers,
wherein the filtrate passageways are arranged parallel to an extension of the at least one row of the plurality of vertically arranged filtration modules and
wherein the filtrate passageways of neighbouring filtration modules are connected to each other to form the filtrate collecting pipe.

5. Fluid treatment system according to claim 1, characterized in that the upper header of each of the plurality of vertically arranged cylindrical filtration modules has a port connecting the upper head space of the filtration modules to respective side ports of an upper collecting pipe forming the upper collecting duct, which upper collecting pipe running lengthwise of the at least one row above the upper headers of the cylindrical filtration modules and connecting the upper head spaces of the cylindrical filtration modules.

6. Fluid treatment system according to claim 1, characterized in that the lower header of each cylindrical filtration modules has a T-shaped form having an upper part being connected to the lower end of the cylindrical shell and horizontal side ports directed lengthwise of the at least one row, wherein the horizontal side ports of neighbouring filtration modules facing each other are connected to form the lower collecting duct.

7. Fluid treatment system according to claim 1, characterized in that the lower header of each cylindrical filtration module has a port connecting the respective lower head space to a lower collecting pipe forming the lower collecting duct which lower collecting pipe running lengthwise of the at least one row below the lower headers of the cylindrical filtration modules and connecting the lower head spaces of the cylindrical filtration modules.

8. Fluid treatment system according to claim 1, characterized in that the filtrate branch pipes of the cylindrical filtration modules within the at least one row are arranged between the filtration modules such that the branch pipes do not extend beyond the cylindrical filtration modules when looked along the at least one row.

9. Fluid treatment system according to claim 1, characterized in that upper header or upper collecting duct and filtrate collecting pipe extend beyond an outer diameter of the cylindrical shell of the filtration modules by at most 20%, relative to the outer diameter of the cylindrical shell, when looked along the at least one row.

10. Fluid treatment system according to claim 1,
wherein the upper header of each cylindrical filtration module has a port connecting the respective upper head space to an upper collecting pipe forming the upper collecting duct, which upper collecting pipe is connecting the upper head spaces of the cylindrical filtration modules and is running lengthwise of the at least one row above the upper headers of the cylindrical filtration modules at the same height level as the filtrate pipe and/or
wherein the lower header of each cylindrical filtration module has a port connecting the respective lower head space to a lower collecting pipe forming the lower collecting duct which lower collecting pipe running lengthwise of the at least one row below the lower headers of the cylindrical filtration modules and connecting the lower head spaces of the cylindrical filtration modules.

11. Fluid treatment system according to claim 1 wherein upper header and/or lower header are releasably connected to the cylindrical shell.

12. Fluid treatment system according to claim 1 wherein the bundle of hollow fiber membranes are incorporated in a cartridge comprising the bundle of hollow fiber membranes, the upper tube sheet and the lower tube sheet, which cartridge being arranged removably in the shell interior.

* * * * *